Patented Oct. 24, 1950

2,527,375

UNITED STATES PATENT OFFICE 2,527,375

POLYHYDROXY POLYSULFIDE POLYMER

Edward M. Fettes, Trenton, N. J., assignor to Thiokol Corporation, a corporation of Delaware No Drawing. Application August 22, 1945, Serial No. 612,128

8 Claims. (Cl. 260—608)

This invention relates to a new class or genus of polyhydric alcohols, methods for the production thereof and the reaction of said polyhydric alcohols with organic acids in general, more particularly, however, reaction with higher fatty acids and polybasic, particularly polycarboxylic, acids to produce esters useful for various purposes including use as plastics, resins, and film-forming materials.

The reaction of polyhydric alcohols, for example, glycols, glycerine and pentoerythritol, with fatty acids or with polybasic including polycarboxylic acids or other acidic substances including abietic acid, is well known for the production of resinous polymers used in the varnish and lacquer arts. For example, alkyd resins are commonly made by the reaction of polyhydric alcohols with various polycarboxylic acids. So-called modified alkyd resins are also obtained by the reaction of polyhydric alcohols with fatty acids and polybasic acids to produce mixed esters. For example, glycerine may be reacted with phthalic acid to produce a polymeric glycerol phthalate. Glycerine may also be converted into a mixed ester of a polybasic, organic acid and a higher monobasic fatty acid as, for example, a mixed ester of maleic acid and abietic acids, or a mixed ester of a polybasic acid such as phthalic or maleic acid with any suitable saturated or unsaturated higher fatty acid such, for example, as oleic acid, linolic acid or linolenic acid.

It is among the objects of the present invention first to provide what may be termed a new and unique class of polyhydric alcohols and secondly to convert those alcohols into other new products including esters whereby new products are obtained possessing new and useful properties which render them valuable in various arts including the paint, varnish and lacquer arts. The new polyhydric alcohols are unique in the sense that they are not only polyhydric alcohols but also possess sulfide linkages in the molecule, particularly of the polysulfide type characterized by the —SS— or dithio linkage. The polymers are also characterized by the presence of a large number of hydroxyl groups in the molecule. They are, in fact, polymeric polyhydric alcohols, that is, the new products are polymers characterized by the presence of units, each of which may have at least one hydroxyl group connected to carbon. These units are joined together to form the polymer by sulfide linkages. The number of hydroxyl radicals or groups in any given polymeric molecule can readily be controlled because it will be a function of the number of hydroxyl groups in the polymeric unit and the number of said units in the polymeric molecule. For example, if the molecular weight of the unit should, purely by way of example, be 100 and if the polymer should be composed entirely of those particular units and have a molecular weight of say 10,000, then the resulting polymeric product would have 100 hydroxyl groups. A polymer possessing that large number of hydroxyl groups may then be reacted with organic acids in general to produce a large variety of new and useful products. Those skilled in the art will, in the light of the present disclosure, realize the large number of new and useful possibilities opened up by the provision of a polymer having such a large number of hydroxyl groups. For example, if each of the hydroxyl groups be esterified with a fatty acid having a molecular weight of the order of about 280, it will be seen that the molecular weight of the ester would be high, i. e., about 36,300 (10,000+ 28,000−1700). With such a higher molecular weight to begin with, not much polymerization is necessary to increase the molecular weight to a very high value. There is thus provided the means of obtaining valuable products from fatty acids such as those from soya bean and fish oil which normally, i. e., in the form of conventional esters, e. g., glycerides and the like, do not undergo the high degree of polymerization characteristic of the more valuable and highly unsaturated acids such as those from linseed and china wood oil and including the reactive linolenic and eleostearic acids.

In the production of the new polymers, there is first provided an organic compound containing at least one alcohol hydroxyl group connected to carbon and in addition at least two functional, polymer-forming groups, for example, at least two halogen atoms connected to carbon, which halogen atoms will be split off by reaction of the organic compound with an alkaline polysulfide or monosulfide or mixture of monosulfide and polysulfide, to form a sulfide polymer having hydroxyl groups distributed along the chain and also having monosulfide or polysulfide linkages between the polymeric units. These functional polymer-forming groups may also be carbon-attached mercapto groups and in such case the polymer may be formed by reacting the organic compound with oxidizing agents in general including alkaline polysulfides. In some cases the polymer-forming functionality of the organic compound may be due to the presence of both halogen atoms and mercapto groups and in such case polymer formation occurs not only by the splitting off of the halogen but also by oxidation of the mercapto groups where a reagent is employed which will not only act as an oxidizing agent but also as an agent which splits off the halogen groups, alkaline polysulfides having a sulfur rank of about 3 to 6 possessing this dual reactivity.

Numerous examples of such compounds are shown in the following table where X stands for either a halogen (or other atom, or group capable of being split off by reaction with alkaline polysulfide) or a mercapto group.

TABLE

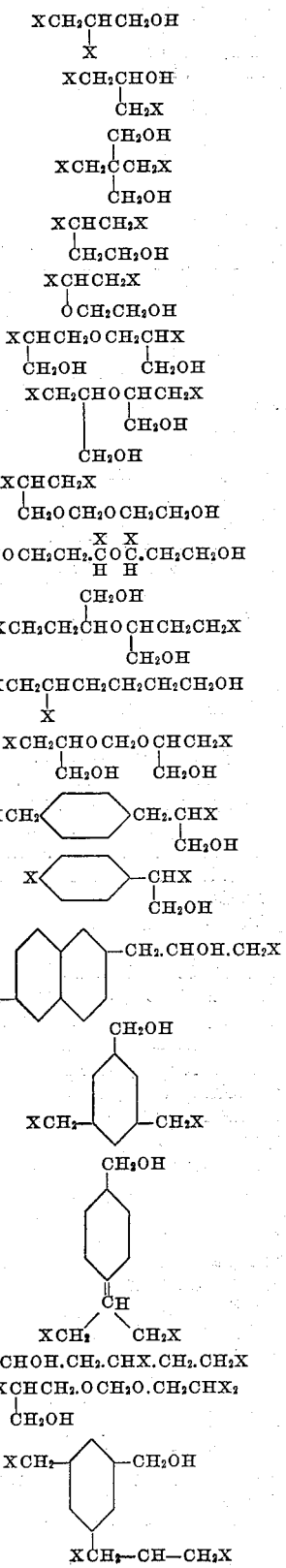

Instead of being confined exclusively to the use of a compound of the character above set forth, it has been found advantageous to produce copolymers involving the use, in addition to compounds having an alcohol group as above described, of organic compounds in general (not containing a hydroxyl group) and characterized by the presence of at least two carbon atoms to each of which is attached at least one functional substituent capable of forming a polysulfide polymer, e. g., a substituent split off by reaction with a polysulfide or a mercapto group. The said two carbon atoms may be adjacent or may be joined to and separated by intervening linkage. It will be unnecessary to set forth here specific instances thereof since it will be sufficient to refer to a number of Patrick patents in which compounds of this character are described at great length. See, for example, Patrick 2,216,044, September 24, 1940. By the use of the compounds referred to immediately above, it is possible to obtain a statistical distribution of the hydroxyl groups in the polymeric chains since the said compounds act as spacing agents. For example, if one reacts an equimolecular mixture of alpha beta dichlor glycerine hydrin and beta beta prime dichlor diethyl formal, the resulting copolymer will contain approximately half as many hydroxyl groups as if the former compound were exclusively employed; and by varying the ratio of the hydroxyl compound to the compound not containing any hydroxyl groups, the number of the latter in the resulting polymer can be controlled at the will of the operator. So also one may react a mixture of alpha beta dimercapto glycerol hydrin (1,2 dimercapto propanol 3) and beta beta prime dimercapto diethyl formal with an oxidizing agent. The general principles whereby oxidation technique may be employed to convert multifunctional mercaptans to polymers is described in Patent 2,142,145, January 3, 1939, and need not be repeated here. So also one may react a mixture of beta beta prime dichlor diethyl formal and 1,2 dimercapto propanol 3 with an alkaline polysulfide, e. g., an alkaline tetrasulfide. In that case the polysulfide performs two functions, one an oxidizing function and the other a halogen-splitting function.

Another characteristic of the polymers of the present invention is that they remain in a liquid or at least flowable condition at normal room temperatures, e. g., 25° C. In order to meet this criterion, certain special techniques are herewith disclosed. According to one method a high molecular weight polymer or copolymer, that is, a polymer or copolymer having a weight of the order of magnitude of 100,000 to 200,000 is produced and this polymer then subjected to cleavage by reaction with, for example, a mixture of sodium hydrosulfide and sodium sulfite in the presence of water for the purpose of splitting the polymer, the fragments having an average molecular weight corresponding to a condition of liquidity, at normal temperatures. Another method of controlling the reaction so as to obtain the polymer in liquid form involves the use of, in addition to the multifunctional organic compound containing two or more halogen atoms or two or more mercapto groups, of a monofunctional compound, that is, a compound containing only one halogen atom or only one mercapto group. By employing suitably restricted proportions of the monofunctional to the polyfunctional compound, the reaction can be caused to be limited in such a way that the resulting polymer will be in a liquid condition at normal temperatures. The use of this particular technique is sometimes known as "chain stopper" technique. Another method involves the use of an excess of the functional organic compound in relation to the polymer-forming reagent or stated conversely a deficiency of the polymer-forming reagent in relation to the functional organic compound. Still another method involves the use of relatively low temperatures in the reaction. These methods will be illustrated by the following examples:

*Example 1.—Formation of high molecular weight polymer and cleavage or splitting of the latter to a liquid condition*

(a) *Formation of polymer.*—To 1.5 mols of sodium disulfide add 0.08 mol of sodium hydroxide, 1 gram of a wetting agent such as sodium naphthalene sulfonate, and 0.04 mol of magnesium chloride to precipitate magnesium hydroxide in situ. Heat the reaction mixture to 70° C. and add dropwise over a period of about 60 minutes a mixture of 0.8 mol of triglycol dichloride and 0.2 mol of glycerol dichlorhydrin. After all of the halogenated reactants are into the reaction vessel, the reaction should be heated to 100° C. and maintained at that temperature for a period of about 30 minutes, after which the latex slurry is diluted with water and permitted to settle. The latex-like dispersion of the polymer is then washed free from soluble salts by repeated dilution with water followed by intermediate settling and dilution. The polymer thus obtained is normally solid and rubber-like when separated as a coagulum from its dispersed condition.

(b) *Conversion of solid to liquid polymer.*—To the latex which has been washed as described above are added .3 mol of sodium hydrosulfide and 1.1 mols of sodium sulfite. The latex is heated with agitation in the presence of the splitting reactants (NaSH and Na2SO3) for about an hour at 80° C. and the solid polymer is thereby converted to one which is normally liquid, i. e., at about 25° C. The latex is washed again as described above until free from soluble salts and is then acidified to a pH of about 4 which causes the breaking of the latex and separation of the viscous liquid. This viscous liquid can then be dried by any suitable method.

The product consists of a mixture of polymers having an average molecular weight much lower than that of the polymer from which the product was made. The molecules of the product are characterized by (a) disulfide linkages, (b) mercaptan terminals and (c) hydroxyl groups along the polymeric chains. They are therefore polythiopolyhydroxy polymercaptans. In this example the polymer made by the procedure (a) was split at —SS— linkages according to the reaction

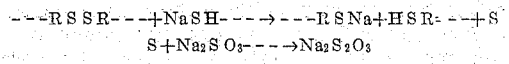

$$S + Na_2SO_3 \longrightarrow Na_2S_2O_3$$

RSS represents an average copolymeric unit.

The NaSH is the splitting reagent and the Na2SO3 is a sulfur acceptor which disturbs the equilibrium and enables the splitting reaction to go forward. In general, splitting may be effected by a compound M2P where P is oxygen or sulfur and M is an alkali metal, ammonium or hydrogen, in the presence of a compound which accepts P and combines therewith to form a stable, non-oxidizing compound. For example, water is a splitting agent in the presence of an oxygen acceptor, e. g., nascent hydrogen.

The dichlorhydrin used in Example 1 was a mixture of 1,2 dichlor propanol 3 and 1,3 dichlor propanol 2 in the ratio of about 75% of the former and 25% of the latter. Instead of this specific product, any of the functional hydroxyl compounds set forth in the table may be substituted in the same mol proportion and instead of the triglycol dichloride used in Example 1 organic compounds in general having a halogen atom or other replaceable substituent attached to each of two different carbon atoms may be employed.

For example, any of the numerous compounds listed in Patrick U. S. 2,216,044, September 24, 1940, may be substituted for the triglycol dichloride of Example 1, it being understood as explained in that patent that where halogen or other replaceable substituent is directly connected to the carbon of an aromatic nucleus that higher temperatures are necessary to split off that replaceable substituent than when one is dealing with a replaceable substituent on a methylene carbon atom. It will be noted that a number of the compounds listed in said Patrick Patent 2,216,044 are characterized by the presence of ether linkage. The use of said compounds confers a similar characteristic on polymers made by the use of said compound.

*Example 2*

Proceed as in Example 1 using only the dichlorhydrin and omitting the triglycol dichloride, and increasing the proportion of dichlorhydrin so that the number of mols thereof are equivalent to the sum of the number of mols of dichlorhydrin and triglycol dichloride.

*Example 3.—Use of a monofunctional compound to limit chain growth*

Use exactly the same procedure as in Example 1 in respect of the quantities of sodium disulfide, wetting agent, sodium hydroxide and magnesium chloride, and feed into the polysufide dispersion at 70° C. a mixture of 0.5 mol of dichlor diethyl formal, 0.4 mol of dichlorhydrin and 0.1 mol of normal or isobutyl chloride, over a period of about 30 minutes. Continue the heating for about 15 minutes at 70° C. and then raise the temperature to 100° C. for 30 minutes. Wash the latex as described in Example 1, acidify to a pH of about 4, separate the non-aqueous phase which will be a liquid viscous polymer and dry.

*Example 4.—Use of a hydroxy compound exclusively and employing a monofunctional halide to obtain liquidity*

Proceed as in Example 3 using 0.8 mol of dichlorhydrin and 0.2 mol of butyl chloride as the sole organic reactants. Instead of butyl chloride, any organic compound having only one replaceable substituent attached to a carbon atom may be used, the replaceable substituent being illustrated by halogens, nitrate, sulfate, phosphate, acetate, propionate, tartrate, etc.

*Example 5.—Using an excess of the functional organic compound or compounds in relation to the alkaline polysulfides*

To 500 cc. of a 2 molar solution of sodium disulfide are added .08 mol of sodium hydroxide and 1 gram of sodium naphthalene sulfonate followed by .04 mol of magnesium chloride to precipitate magnesium hydroxide in situ. Heat the polysulfide mixture to 70° C. in a flask equipped with mechanical agitation and add drop wise over a period of about 30 minutes a mixture of 0.6 of a mol of dichlor diethyl formal and 0.6 mol of mixed alpha and beta dichlorhydrins. After all of the organic reactants have been added, heat to 70° C. for an additional 15 minutes, after which the temperature is raised to 100° C. and held there for about 30 minutes. The latex-like dispersion resulting from this reaction is allowed to settle and the supernatant liquid is decanted, after which the dispersion is washed by repeated dilution with water, settled and decanted until free from dissolved salts. Acidify the washed dispersion to a pH of about 4 thereby causing the separation of a liquid polymer. Separate the aqueous material from the polymer and dry the latter by any suitable means.

*Example 6*

Proceed as in Example 5 except that 1.2 mols of the mixture of alpha and beta dichlorhydrins are used instead of the .6 mol of dichlor diethyl formal and .6 mol of the dichlorhydrin described in Example 5. The resulting polymer is washed as described in Example 5, acidified and then the separated liquid polymer dried.

*Example 7.—Preparation of polymer where the polymer-forming functionality is due to SH groups*

To 1 mol of 1,3 dimercapto propanol 2, are added 500 cc. of water containing 1 gram of sodium napthalene sulfonate and 5 grams of freshly precipitated magnesium hydroxide, and 0.5 mol of sodium hydroxide. The flask is equipped with an efficient mechanical agitator and the mixture is stirred until a smooth dispersion of the mercaptan is obtained under conditions where atmospheric oxidation is carefully excluded, such as by the use of a stream of nitrogen or other inert gas. To the agitated dispersion are added 180 cc. of a standard 5 molar solution of hydrogen peroxide. The temperature during this reaction should be maintained at about 25–30° C. and the stirring should be continued for 15 minutes after the addition of the hydrogen peroxide solution, at the end of which time the mixture should be acidified to a pH of about 4, after which the stream of nitrogen can be discontinued and the dispersion washed by repeated dilution and decantation with water. The proportions of oxidizing agent used in this case to the mercaptan are in the ratio of 9 to 10 which produces a polymer of approximately 10 monomeric units in the average molecular chain corresponding to a molecular weight of about 1200.

*Example 8.—Preparation of copolymer employing mercapto oxidation*

Proceed as in Example 7 except that instead of 1 mol of 1,3 dimercapto propanol 2 only .5 mol of this compound is used mixed with .5 of a mol of beta beta prime dimercapto ethyl ether.

*Example 9.—Use of relatively low temperature to control the molecular size of the product*

To 1.1 mols of sodium disulfide add .08 mol of sodium hydroxide and 1 gram of sodium naphthalene sulfonate. To this mixture is added .04 mol of magnesium chloride to precipitate magnesium hydroxide in situ. Heat the reaction mixture to 70° C. and add drop wise over a period of about 60 minutes a mixture of .8 of a mol of triglycol dichloride and .2 of a mol of a mixture of alpha and beta dichlorhydrins. Heat at 70° C. for about 15 minutes after all of the dihalides are in the reaction. Wash the latex like dispersion by decantation until free from soluble salts. Coagulate the liquid polymer dispersion by the addition of acid to a pH of about 4 and dry the polymer by any suitable means such as heating.

*Example 10*

Proceed as in Example 9 except that 1 mol of a mixture of alpha and beta dichlorhydrins are substituted for the .8 mol of triglycol dichloride and .2 of a mol of dichlorhydrin of Example 9.

It will be understood that in all the above examples there may be used instead of the particular functional compound containing an alcohol any of the compounds listed in the table or mixtures thereof in the same molecular ratios employed in the same examples and that instead of the functional compounds not containing a hydroxyl group (used to prepare copolymers), there may be used in general organic compound containing a halogen atom (or other group adapted to form a polysulfide polymer) attached to each of two different carbon atoms.

Having obtained the polyhydroxy polymer in a form which is normally liquid by methods illustrated as above set forth, it may then be esterified with organic acids particularly those selected from the group consisting of higher saturated and unsaturated fatty acids and polybasic including polycarboxylic acids and mixtures thereof to produce new, improved, and useful esters or condensation products. The higher fatty acids which may be mentioned include stearic acid, oleic acid, linolic acid, linolenic acid, eleostearic acid, abietic acids, and other resin acids, phthalic acid, maleic acid, fumaric acid, adipic acid, succinic acid, sebacic acid and polybasic especially polycarboxylic organic acids in general. Moreover, mixed esters may be obtained by the conjoint or consecutive use of higher monobasic or fatty acids and polybasic acids. For purposes of illustration the following example will be given, the particular polymer in this instance being that produced as in Example 9.

*Example 11*

To 100 grams of the polymer produced according to Example 9 is added 50 grams of the mixture of fatty acids derived from the hydrolysis of linseed oil. Heat the mixture to 200–225° C. to drive off the water. This may be done in any suitable distillation apparatus or even in an open vessel. The mixture if examined on a glass plate on reaching 200° C. is opaque. However, on continued heating at that temperature for about 15 minutes, a clear, amber, viscous reaction product is obtained. Heating may be continued at said temperatures until esterification is complete as indicated by the fact that little or no more water is evolved. The temperatures and times of esterification may, of course, be varied. Esterification catalysts or condensing agents may be employed. Esterification may be effected at room temperature by using suitable condensing or dehydrating or catalytic agents, e. g., by using dry HCl. After esterification is completed, polymerization or condensation of the resulting ester may be brought about by heating to suitable temperatures.

In Example 11, instead of using the polymer of Example 9, the polymers made according to Examples 1 to 8 and 10, respectively, may be used.

Example 12

Proceed as in Example 11. Substitute phthalic acid for the linseed oil fatty acids in about one-half the molecular proportion, that is, using about 14 grams of phthalic acid instead of the 50 grams of linseed oil fatty acids. Heat the mixture to about 200 to 225° C. to drive off water and hold at that temperature until the desired degree of esterification and condensation has occurred.

Example 13

Proceed as in Example 11 using a mixture of a polycarboyxlic acid and a higher fatty acid instead of the linseed oil fatty acids. For example, substitute for the 50 grams of linseed oil fatty acids a mixture of about 25 grams of soya bean oil fatty acids and about 6 grams of phthalic acid.

Instead of preparing the polymer by the exclusive use of an alkaline disulfide or other polysulfide, the polymer may be prepared by employing a mixture of ionizable monosulfides and di- or poly-sulfides, e. g., a mixture having the empirical formula $MS_{1.1 \text{ to } 1.9}$ where M signifies an alkali or alkaline earth metal and S is a sulfur atom. In this manner, a polyhydroxy polymer will be obtained which is characterized by the presence not only of disulfide —SS— linkages but also monosulfide linkages. The resulting polymer may advantageously be reacted with polycarboxylic organic acid or monobasic fatty acids or mixtures thereof. An example of the preparation of such polyhydroxy polymer is as follows:

Example 14

Proceed as in any of Examples 1 to 6, inclusive, 9 and 10, substituting for the alkaline disulfide described therein the same or substantially the same molecular proportion of alkaline sulfide having the statistical and empirical formula $MS_{1.1 \text{ to } 1.9}$.

Example 15

Proceed as in any of the Examples 11 to 13, inclusive, using a polymer as produced in Example 14.

It will be observed that the polymers of this invention are characterized by the presence of polymeric units having the formula SRS (which may also be written RSS) where R is a radical selected from the group consisting of

designating adjacent carbon atoms and

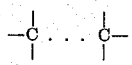

designating carbon atoms joined to and separated by intervening structure and that at least some of said units contain an alcohol group.

While in many cases the polymer will be composed largely or wholly of units having the above-identified skeleton carbon structure, the polymer need not always be composed exclusively of such units since some of the units may have a skeleton carbon structure symbolized by the expression

where C is a single carbon atom. For example, a copolymer may be made by reacting an alkaline sulfide, as herein disclosed, with a mixture of alpha beta dichlorhydrin, 1.5 dichlorpentane and methylene dichloride. The skeleton carbon structure of the units of which the resulting polymer is composed will be

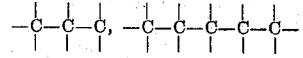

and

Instead of methylene dichloride other compounds having two halogans (or equivalent replaceable groups) attached to the same carbon atom may be used, e. g., benzal chloride.

Another identifying characteristic of the polymers of this invention is the fact that upon exhaustive treatment with an alkaline hydrosulfide in conjunction with an alkaline sulfite, cleavage occurs with the production of one or more polymercaptans containing at least two —SH groups and at least one hydroxyl group. By exhaustive treatment is meant treatment with at least one mol of alkaline hydrosulfide and one mol of alkaline sulfite for each molecular weight of the average polymeric unit. The polymer of Example 1 was made by using 1 mol of organic reactants. The mass of the resulting polymer is therefore empirically equivalent to 1 mol of polymeric unit SRS. The minimum proportion of NaSH, for example, necessary to completely dismember the polymer into monomeric mercaptans having the general formula HSRSH is one mol of NaSH and the corresponding minimum proportion of $Na_2SO_3$, for example, to accept the sulfur produced by the equilibrium between the polymer and NaHS is one mol of $Na_2SO_3$. If the liquid polymer of Example 1 be heated with 1 mol of NaSH and 1 mol of $Na_2SO_3$, it will produce a mixture containing beta (mercapto ethoxy) beta prime mercapto ethyl ether and dimercaptohydrins, i. e., 1,2 dimercapto propanol 3 and 1,3 dimercapto propanol 2. The stated proportions provide somewhat of an excess over the minimal proportions above referred to because the normally solid polymer initially produced in Example 1 was already partly dismembered in the conversion thereof into the liquid polymer.

The polymers of this invention may be succinctly described as polyhydroxy polythio polymers and also as polyhydroxy polythio polymercaptans existing normally, i. e., at 25° C., in a liquid condition. The structure may be described more in detail (in addition or alternatively to the description previously given) by stating that those polymers comprise or include units containing at least two carbon atoms, that some of the units may contain only one carbon atom, that the units of which the polymer is composed are connected together by sulfur linkages at least some of which are disulfide (—SS—) linkages, that at least some of said units contain at least one alcohol group and that upon exhaustive treatment of said polymer with an alkaline hydrosulfide in conjunction with an alkaline sulfite, one or more monomeric polymercaptans are obtained containing at least one alcohol group.

What I claim is:

1. A polythio polyhydroxy polymercaptan normally existing at 25° C. in the liquid condition, said polymercaptan being essentially composed of a series of monomeric organic radicals connected by disulfide linkages, said radicals being selected from the group consisting of radicals composed of carbon and hydrogen and radicals composed of carbon, hydrogen and oxygen, with hydroxy and mercapto groups attached to carbon atoms of said series, all of the oxygen atoms of said radicals being connected in structure of the group consisting of

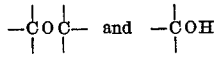

2. A polysulfide polymer normally existing at 25° C. as a liquid, said polymer comprising a series of units SRS joined together to form a polymer containing recurring carbon-attached SS linkages where S is a sulfur atom and where R is a radical selected from the group consisting of

designating adjacent methylene carbon atoms and

designating methylene carbon atoms joined to and separated by saturated aliphatic groups, at least some of said units containing an hydroxyl group, attached to a carbon atom of said radical.

3. A polysulfide polymer normally existing at 25° C. as a liquid, said polymer being composed essentially of a series of units SRS joined together to form a polymer containing recurring SS linkages where S is a sulfur atom and where R is a radical of the group consisting of

designating adjacent methylene carbon atoms and

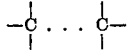

designating methylene carbon atoms joined to and separated by a saturated aliphatic radical at least some of said units containing an hydroxy group and said polymer yielding upon exhaustive treatment with an alkaline hydrosulfide in conjunction with an alkaline sulfite a monomeric mercaptan containing at least two —SH groups and at least one hydroxyl group.

4. A polyalkylene polyhydroxy polysulfide polymer composed essentially of a series of units which are chain-forming polyalkylene radicals joined by —SS— linkages, at least some of said units having a carbon-attached hydroxyl group said polymer normally existing at 25° C. as a liquid.

5. A polyhydroxy polyalkylene polymercaptan polymer essentially composed of a series of units which are polyalkylene radicals joined by —SS— linkages including units having a hydroxyl radical attached to an aliphatic carbon atom, said polymer normally existing at 25° C. as a liquid.

6. A polythio polyhydroxy polymercaptan normally existing at 25° C. as a liquid and composed essentially of multiply recurring hydroxylated units having the formula [—SRS—] where S is sulfur and R is a saturated aliphatic radical composed of carbon, hydrogen and oxygen and having two aliphatic carbon atoms connected, respectively, to said sulfur atoms, said radical R having a carbon-attached hydroxyl group and all the oxygen of said radical R being connected in structure of the group consisting of

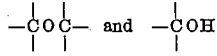

7. A polythio polyhydroxy polymercaptan normally existing at 25° C. as a liquid and composed essentially of multiply recurring units having the formula

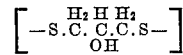

8. A polythio polyhydroxy polymercaptan normally existing at 25° C. as a liquid and essentially composed of multiply recurring units having the formula

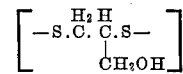

EDWARD M. FETTES.

REFERENCES CITED

The following references are of record in the file of this patent:

UNITED STATES PATENTS

| Number | Name | Date |
| --- | --- | --- |
| 2,100,968 | Lillienfeld | Nov. 30, 1937 |
| 2,285,516 | Knight | June 9, 1942 |
| 2,322,938 | Howard | June 29, 1943 |
| 2,336,074 | Cook | Dec. 7, 1943 |
| 2,344,137 | Drummond | Mar. 14, 1944 |
| 2,360,904 | Smith | Oct. 24, 1944 |
| 2,369,612 | Schirm | Feb. 13, 1945 |
| 2,402,665 | Peppel et al. | June 25, 1946 |

OTHER REFERENCES

Patrick: "Transactions of the Faraday Society," vol. 32 (1936), pages 347–357.

Ellis: "Hydrogenation of Organic Compounds," 3rd edition (1930), Van Nostrand, publisher, page 189.